April 29, 1924.

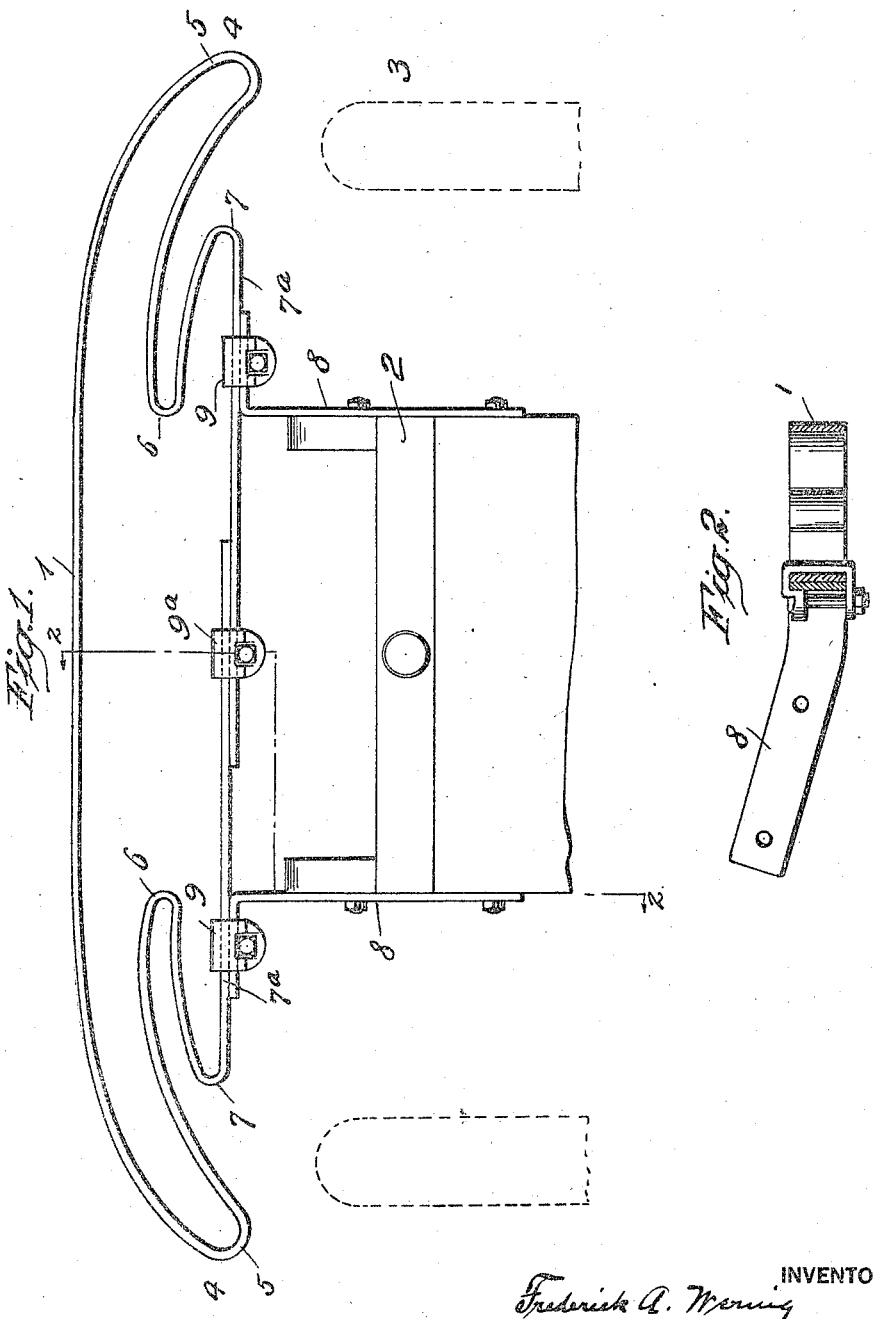

F. A. WERNIG

AUTOMOBILE BUMPER

Filed Dec. 22, 1922

Inventor
Frederick A. Wernig
By his Attorney

Patented Apr. 29, 1924.

1,491,939

UNITED STATES PATENT OFFICE.

FREDERICK A. WERNIG, OF BROOKLYN, NEW YORK.

AUTOMOBILE BUMPER.

Application filed December 22, 1922. Serial No. 608,385.

*To all whom it may concern:*

Be it known that I, FREDERICK A. WERNIG, a citizen of the United States, and a resident of the borough of Brooklyn, county of Kings, and State of New York, have invented certain new and useful Improvements in Automobile Bumpers, of which the following is a specification.

This invention relates to improvements in automobile bumpers.

One of the objects of this invention is to produce an automobile bumper which will, in performing its function of absorbing shocks from collisions and the like, have greatly increased cushioning effect in combination with a pleasing appearance.

Another object is to produce an automobile bumper having an impact member, preferably composed of a strip of spring steel, extending transversely across the front of the machine and having a plurality, and preferably three, complementary or cooperating and interconnected cushioning-bends or loops at each of the opposite ends of the bumper, one of which bends or loops is a primary loop disposed outwardly, another is a secondary bend or loop disposed inwardly and located directly back of the primary bend or loop, and the third bend or loop is a supporting loop located directly back of the intermediate loop, whereby shocks caused by collisions or the like will be taken up, first, by the primary loop or bend, then by the secondary loop or bend and lastly by a supporting loop or bend before the shock is transmitted to the supporting members.

Another object is to produce a bumper having primary, secondary and supporting loops which loops decrease in length from the primary loop inwardly and consequently similarly decrease in resilience, so that the primary loop in combination with the secondary loop will take up shocks of greater magnitude than the primary loop alone and the three loops combined will take up or absorb still greater shocks before all of the loops are collapsed and the relatively rigid support is encountered.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a plan view of an automobile bumper embodying my invention attached to the front of an automobile chassis;

Fig. 2 is a section on the line 2—2 of Fig. 1; and

Figure 3:
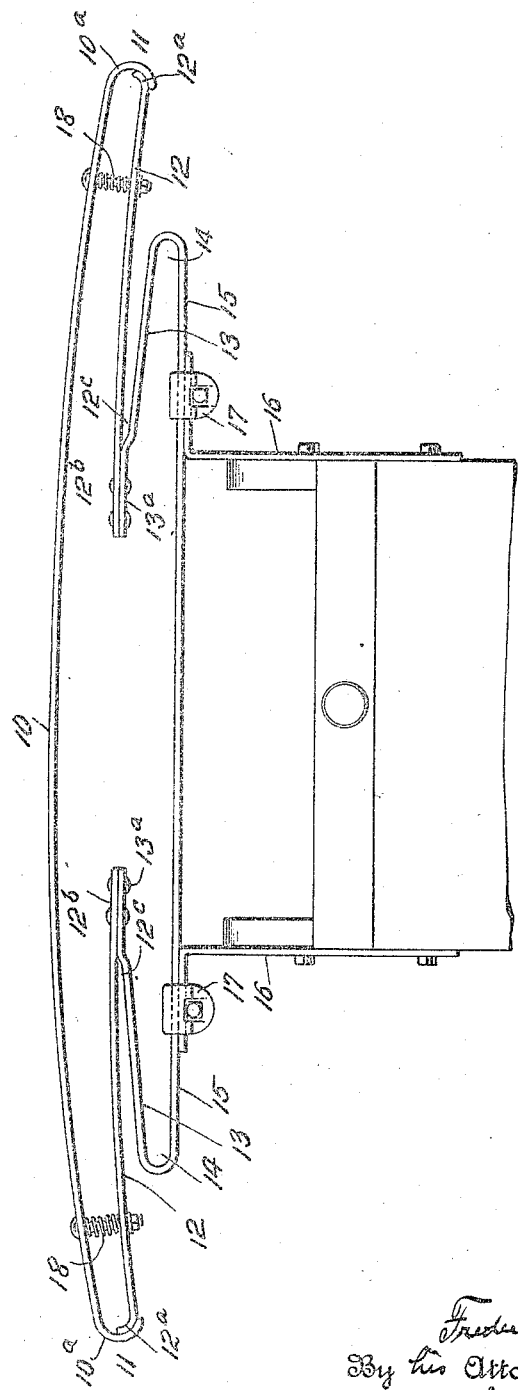
Fig. 3 is a similar plan view of a modified form of my invention.

Referring now to these drawings, and particularly to Figs. 1 and 2 thereof, 1 indicates an impact bar which, as shown, extends transversely across the automobile body 2 and wheels 3 and has at each of its opposite ends terminal portions 4 comprising three resilient bends or cushioning loops, two of which are disposed outwardly and the other being an intermediate loop disposed in the reverse direction or inwardly. As shown in Fig. 1, each of the terminal portions 4 comprises a primary loop 5, which as illustrated is a relatively long loop having a rearward curvature; a secondary loop 6 which in Fig. 1 is formed integrally with the primary loop 5 and is disposed inwardly and a supporting loop 7 which is disposed outwardly and is also formed of the same strip of metal as the primary and secondary loops. The secondary and supporting loops 6 and 7 are preferably disposed within the sector of the rearward curve of the primary loop 5 and the loops vary in length and consequently in resilience from the primary bar to the supporting bar, so that a shock upon the impact bar, although being cushioned by all of the loops conjointly, will, if great enough, first close the primary loop, then the secondary loop and lastly the supporting loop before such shock reaches the bumper supports.

As illustrated, the supporting loops are provided with inwardly disposed legs 7$^a$ which abut against and are secured to supporting bars 8 by means of any suitable clamps 9. The legs 7$^a$ preferably cross each other or overlap at the middle of the car body and are at this point preferably fastened together by a clamp 9$^a$.

In Fig. 3 I have shown a modified form of my bumper in which an impact member 10 is associated at each of its opposite ends with loop portions 11 having three cushioning loops, two of which are disposed outwardly and the other being a secondary loop disposed in the reverse direction or inwardly. In this figure the triple cushioning loop portion is formed of a plurality of pieces. Thus each of the opposite ends of the impact bar is provided with a curved portion 10$^a$ which abuts against a curved portion 12$^a$ of an intermediate bar 12, which is disposed inwardly and abuts at its opposite end 12$^b$ against a terminal portion 13$^a$ of one leg 13 of a supporting loop 14, the opposite leg 15 of said loop 14 abutting against a bracket bar 16 to which it is clamped by clamps 17. The impact bar is spaced from the intermediate bar 12 and a coiled spring 18 is interposed between the two bars so that the outer end of the impact bar 10 and the bar 12 spaced therefrom form, in effect, a primary cushioning or resilient loop or bend which will take up the first shock of a collision. The intermediate bar 12 is spaced from the intermediate bar 13 so as in effect to form an inwardly disposed bend or loop 12$^c$ which will serve to take up shocks of collision after the closing of the space between the legs of the primary loop and the supporting loop 14 will finally take up shocks that are too great to be taken up by the primary and secondary loops above-referred to.

The action of this modified form of bumper will be quite similar to the action of the bumper described in Fig. 1 except that the impact bar and coil springs will take up a greater proportion of a light shock of a collision and relatively little shock will be transmitted to the secondary bar 12 until the impact bar reaches its limit of inward cushioning movement on the coiled springs 18, after which the loops 12$^c$ and 14 will co-act and cushion strains in the same manner as hereinabove described with relation to the integrally formed loops in Fig. 1.

Having described my invention, I claim:—

1. An automobile bumper embodying, in combination, an impact member extending transversely across the car body, and loop portions associated with said impact member and comprising two outwardly disposed cushioning bends and a reversely disposed bend intermediate such outwardly disposed bends.

2. An automobile bumper embodying, in combination, an impact bar extending transversely across the body of the machine and having associated therewith at each of its opposite ends three loops, one of which is arranged between the other two, and means at the opposite sides of the midplane of the car for supporting said bumper.

3. An automobile bumper embodying, in combination, an impact bar extending transversely across the body of the machine and having associated therewith at each of its opposite ends a loop portion comprising a primary outwardly-extending cushioning-loop, a secondary inwardly-extending cushioning-loop and an outwardly-extending supporting and cushioning loop, and means at opposite sides of the midplane of the car for supporting said bumper.

4. An automobile bumper embodying, in combination, an impact bar extending transversely across the body of the machine and having associated therewith at each of its opposite ends a loop portion comprising a primary outwardly-extending cushioning-loop, a secondary inwardly-extending cushioning-loop and an outwardly-extending supporting and cushioning loop, the primary loop being longer than the secondary and supporting loops, and means at opposite sides of the midplane of the car for supporting said bumper.

5. An automobile bumper embodying, in combination, an impact bar extending transversely across the body of the machine and having associated therewith at each of its opposite ends a loop portion comprising a primary outwardly-extending cushioning loop, a secondary inwardly-extending cushioning loop and an outwardly extending supporting and cushioning loop, the primary loop being longer than the secondary and supporting loops and being curved rearwardly contiguous to its end, and means at opposite sides of the midplane of the car for supporting said bumper.

6. An automobile bumper embodying, in combination, an impact bar extending transversely across the body of the machine and having associated therewith at each of its opposite ends a loop portion comprising a primary outwardly-extending cushioning loop, a secondary inwardly-extending cushioning loop and an outwardly extending supporting and cushioning loop, the primary loop being longer than the secondary and supporting loops and being curved rearwardly contiguous to its ends, and the secondary and supporting loops being disposed within the sector of said rearward curve of the primary loop and means at opposite sides of the midplane of the car for supporting said bumper.

7. An automobile bumper embodying, in combination, an impact bar having at each of its opposite ends a plurality of integral shock-cushioning loops comprising two outwardly disposed cushioning bends and a reversely disposed bend intermediate such outwardly disposed bends, and means for supporting said impact bar at opposite sides of the midplane of the car.

In witness whereof, I have signed my name to the foregoing specification in the presence of two subscribing witnesses.

FREDERICK A. WERNIG.

Witnesses:
HELEN V. WHIDDEN,
JULIUS M. LUTZ.